March 2, 1965  J. DE RONDE  3,171,386
ANIMAL GRAPPLE DEVICE
Filed March 22, 1963
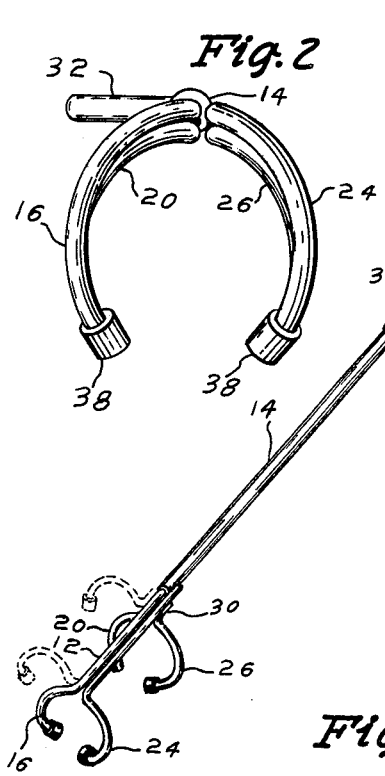
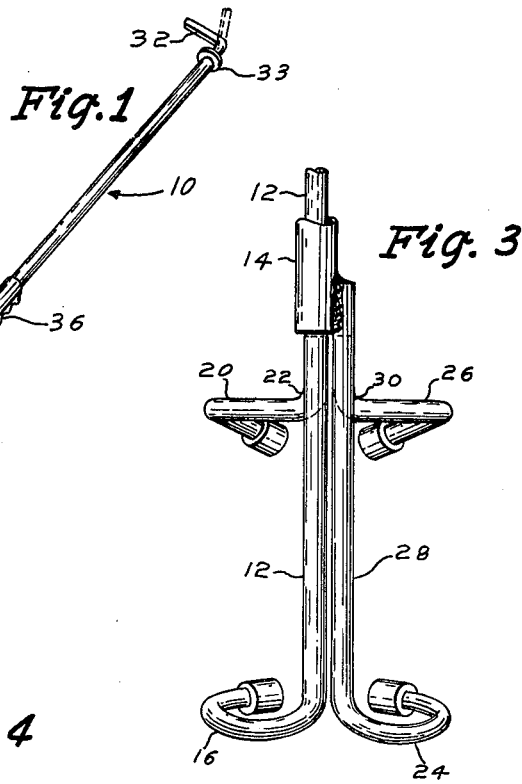
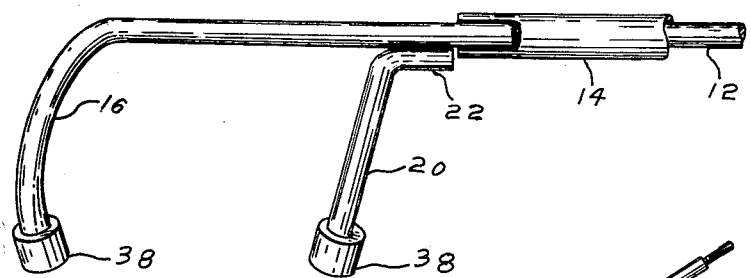
INVENTOR
JOHN DERONDE
BY
Dick, Zarley + Henderson
ATTORNEYS

3,171,386
ANIMAL GRAPPLE DEVICE
John De Ronde, Otley, Iowa
Filed Mar. 22, 1963, Ser. No. 267,223
10 Claims. (Cl. 119—154)

This invention relates to an animal grapple device and in particular to a device for remote handling of small pigs.

In working with a sow and her litter of pigs when they are restrained to the farrowing pen, it is often necessary to separate individual pigs from the mother. This can become a dangerous operation because the sow is instinctively protective of her litter and usually will resist any effort made to enter her pen and especially the handling of her babies. Thus, heretofore removal of pigs from the farrowing pen in the presence of the mother had to be accomplished at the risk of an attack by her or done surreptitiously which would involve danger to the farmer if discovered by the sow.

Therefore, it is an object of this invention to provide an animal grapple device suitable for extending over the farrowing pen wall to grasp a pig and remove it therefrom while in the presence of its mother without endangering the operator of the grapple device.

It is a further object of this invention to provide an animal grapple device which will hold the pig gently around its body section between its front and back legs.

It is a further object of this invention to provide an animal grapple which is easily operated from a closed position to an open position by the operator's two hands.

It is a further object of this invention to provide an animal grapple device which has jaws which have a shape corresponding to the shape of the pig between its front and rear legs.

It is a further object of this invention to provide an animal grapple device having a handle means which opens and closes its jaws and is positioned relative to the device housing such that the hand on the handle will naturally urge the jaws to their closed position making it practical to catch and carry a pig in the grapple device.

A further object of this invention is to provide an animal grapple device having protective caps fitted over the ends of the jaws to prevent injury to the animal restrained in the device.

A still further object of this invention is to provide an animal grapple device having jaws which all extend into a common horizontal plane although the device may be held at an angle to the ground.

A further object of this invention is to provide an animal grapple device which is simple in design, economical to manufacture and refined in appearance.

These and other objects, and other features and advantages of this invention will become readily apparent upon reference to the following description when taken in conjunction with the accompanying drawings, wherein:

FIG. 1 is a perspective view of the device shown with its jaws in their open and closed positions.

FIG. 2 is an end elevation view of the device showing its jaws in their closed position.

FIG. 3 is a fragmentary top plan view of the device showing its jaws in their closed position.

FIG. 4 is a fragmentary side elevation view of the one end of the device and showing in particular the jaws carried by the rod member with the jaws carried by the housing removed for purpose of clarity;

FIG. 5 is a fragmentary side elevation view of a modified form of the device showing structure corresponding to that in FIG. 4.

The animal grapple device of this invention is referred to generally in FIG. 1 by reference numeral 10 and basically comprises a rod 12 (FIG. 4) extending through a housing 14.

As best illustrated in FIG. 3, the rod 12 is provided with a jaw 16 at one end thereof which as shown in FIG. 2 extends from the longitudinal axis of the rod 12 downwardly and outwardly and as shown in FIGS. 3 and 4 it extends forwardly thereof. The jaw 16 after reaching its furthest transverse distance from the longitudinal axis of the rod 12, as shown in FIGS. 3 and 4, extends downwardly, inwardly and rearwardly thereof.

A second jaw 20 (FIG. 4) is formed from a rod member and secured at an end 22 in parallel relationship to the bottom side of rod 12 and is adapted to abut the edge of the adjacent end of housing 14 (see also FIG. 3). The other end of jaw 20 extends outwardly from the longitudinal axis of end 22 and downwardly thereof and thence inwardly toward end 22 and forwardly and downwardly thereof.

The housing 14 at its end adjacent jaws 16 and 20 is provided with a pair of jaws 24 and 26 respectively in registering relationship therewith.

The jaw 24 is formed from a rod 28 secured at one end by weld to the end of the housing 14. The rod 28 then extends closely parallel in the same horizontal plane as rod 12 (FIG. 3) and terminates in a similarly shaped jaw 24 as jaw 16.

The other jaw 26 is formed from a rod and has an end 30 (FIGS. 1 and 3) welded in parallel relationship under and along the bottom side of rod 28. The other end opposite end 30 is shaped identical to jaw 20.

The end of rod 12 opposite jaw 16 is formed at a right angle to the rod's longitudinal axis thereby providing a handle 32 (FIG. 1). Between the adjacent end of housing 14 and the handle 32 is provided a washer 33 welded to the rod 12 to limit the rod's longitudinal movement forwardly in the housing 14.

Intermediate the ends of the housing 14 is provided a rubber hand grip sleeve member 34 having finger notches 36 formed in the bottom side thereof.

To protect the animals from injury by the jaws closing on them, a rubber cap 38 is provided on the end of each jaw.

In operation it is seen that through movement of the handle 32 from a horizontal position to a vertical position (see the broken line position) by the right hand (in the case of a right handed person), while holding the housing 14 by the grip 34 with the left hand, the jaws 16 and 20 will be rotated outwardly (see broken line position) from corresponding jaws 24 and 26 respectively, as best shown in FIG. 1. Conversely, returning the handle 32 to its horizontal position will return jaws 16 and 20 to a position closely adjacent to jaws 24 and 26 but not touching, as they are held in spaced relationship by the parallel ends 22 and 30 of jaws 20 and 26 respectively coming into abutting side engagement (FIG. 3).

Longitudinal relative movement of the rod 12 in the housing 14 is limited in the forward direction by washer 33 and in the rearward direction by the end 22 of jaw 20 abutting against the adjacent end of the housing 14.

As seen in FIG. 5 a modified form of the animal grapple device is provided. It differs from the grapple device 10 of FIG. 1 only by the fact that the rear jaw elements 20' and 26' are longer than jaws 16' and 24' (jaws 24' and 26' are not shown) and thereby extend into a horizontal plane through the lower ends of the forward jaws 16' and 24' when the device is held at a twenty-five to thirty-five degree angle to the horizontal. This is approximately the angle between the device and the ground when it is held over a farrowing pen wall in a position to pick up a pig. By this arrangement of jaw elements, it may be easier to position the rear jaws 20' and 26' under the pig's mid-section.

Some changes may be made in the construction and arrangement of my animal grapple device without departing from the real spirit and purpose of my invention, and it is my intention to cover by my claims, any modified forms of structure or use of mechanical equivalents which may be reasonably included within their scope.

I claim:
1. An animal grapple device comprising in combination:
   an elongated housing member;
   a first rod member rotatably positioned in said housing member and having its ends extending beyond the adjacent ends of said housing member;
   a second rod member affixed in parallel relationship to the side of one end of said housing member, said second rod extending along said first rod member and terminating in a first jaw portion, said first jaw portion extending downwardly, outwardly and forwardly of said second rod, and thence downwardly, inwardly and rearwardly of said second rod and terminating therebelow;
   a third rod member affixed in parallel relationship to said grapple device adjacent said connection between said housing and said second rod member, said third rod member being spaced rearwardly of said first jaw portion and terminating in a second jaw portion, said second jaw portion extending outwardly and downwardly of said second rod member, and thence inwardly, and downwardly of said second rod member and terminating therebelow;
   said first rod member terminating at one end in a third jaw portion adjacent said first jaw portion, said third jaw portion extending downwardly, outwardly, and forwardly of said first rod, and thence downwardly, inwardly and rearwardly of said first rod member;
   a fourth rod member affixed to said first rod member adjacent said one end of said housing and terminating at one end in a fourth jaw portion adjacent said second jaw portion, said fourth jaw portion extending outwardly and downwardly of said fourth rod member, and thence inwardly and downwardly of said second rod member and terminating therebelow, the other end of said fourth rod member adapted to engage said one end of said housing to limit relative longitudinal movement between said first rod member and said housing;
   means on the other end of said first rod member adapted to engage said other end of said housing to limit relative longitudinal movement therebetween;
   handle means on the other end of said first rod member to impart rotational movement thereto relative to said housing; and said first and third jaw portions respectively and said second and fourth jaw portions respectively adapted to move in registering relationship to and from an open and closed position.

2. The structure of claim 1 wherein said handle means extends at a right angle to said first rod member in a horizontal plane when said jaw portions are in a closed position extending downwardly and extends in an upward direction when said jaw portions are in an open position whereby downward force applied by one hand to said handle will maintain the jaw portions in their closed position.

3. In a grapple device adapted to be held at approximately a thirty to forty-five degree angle to the ground comprising,
   an elongated housing member;
   a first rod member rotatably positioned in said housing member and having its ends extending beyond the adjacent ends of said housing member;
   a second rod member affixed in parallel relationship to the side of one end of said housing member, said second rod extending along said first rod member and terminating in a first jaw portion, said first jaw portion extending downwardly, outwardly and forwardly of said second rod, and thence downwardly, inwardly and rearwardly of said second rod and terminating therebelow;
   a third rod member affixed to said second rod member adjacent said connection between said housing and said second rod member, said third rod member being spaced rearwardly of said first jaw portion and terminating in a second jaw portion, said second jaw portion extending outwardly and downwardly of said second rod member, and thence inwardly, and downwardly of said second rod member and terminating therebelow in the horizontal plane of the free end of said first jaw portion when said device is being held at a 30 to 45 degree angle to the ground;
   said first rod member terminating at one end in a third jaw portion adjacent said first jaw portion, said third jaw portion extending downwardly, outwardly, and forwardly of said first rod, and thence downwardly, inwardly and rearwardly of said first rod member and terminating in the horizontal plane of said free end of said first jaw portion when said device is being held at a 30 to 45 degree angle to the ground;
   a fourth rod member affixed to said first rod member adjacent said one end of said housing and terminating at one end in a fourth jaw portion adjacent said second jaw portion, said fourth jaw portion extending outwardly and downwardly of said fourth rod member, and thence inwardly and downwardly of said second rod member and terminating therebelow, in the horizontal plane of said free end of said first jaw portion when said device is being held at a 30 to 45 degree angle to the ground, the other end of said fourth rod member adapted to engage said one end of said housing to limit relative longitudinal movement between said first rod member and said housing;
   means on the other end of said first rod member adapted to engage said other end of said housing to limit relative longitudinal movement therebetween;
   handle means on the other end of said first rod member to impart rotational movement thereto relative to said housing; and said first and third jaw portions respectively and said second and fourth jaw portions respectively adapted to move in registering relationship to and from an open and closed position.

4. In an animal grapple device comprising,
   an elongated housing member;
   a first rod member rotatably positioned in said housing member and having its ends extending beyond the adjacent ends of said housing member;
   a second rod member affixed in parallel relationship to the side of one end of said housing member, said second rod extending along said first rod member and terminating in a first jaw portion, said first jaw portion extending downwardly, outwardly and forwardly of said second rod, and thence downwardly, inwardly and rearwardly of said second rod and terminating therebelow.
   a third rod member affixed in parallel relationship to said grapple device adjacent said connection between said housing and said second rod member, said third rod member being spaced rearwardly of said first jaw portion and terminating in a second jaw portion, said second jaw portion extending outwardly and downwardly of said second rod member, and thence inwardly, and downwardly of said second rod member and terminating therebelow;
   said first rod member terminating at one end in a third jaw portion adjacent said first jaw portion, said third jaw portion extending downwardly, outwardly, and forwardly of said first rod, and thence downwardly, inwardly and rearwardly of said first rod member;

a fourth rod member affixed to said first rod member adjacent said one end of said housing and terminating at one end in a fourth jaw portion adjacent said second jaw portion, said fourth jaw portion extending outwardly and downwardly of said fourth rod member, and thence inwardly and downwardly of said second rod member and terminating therebelow;

stop means for limiting relative longitudinal movement between said housing and said first rod member;

handle means on the other end of said first rod member to impart rotational movement thereto relative to said housing; and said first and third jaw portions respectively and said second and fourth jaw portions respectively adapted to move in registering relationship to and from an open and closed position.

5. The structure of claim 4 and handle means affixed to said housing intermediate its ends.

6. The structure of claim 4 and blunt protective caps secured to the free ends of each of said jaw portions to permit gentle handling of animals.

7. The structure of claim 4 wherein said third rod is secured to the bottom side of said second rod member and said fourth rod is secured to the bottom side of said first rod, the secured portions of said third and fourth rods are adapted to engage each other when said jaws are moved to their closed position to limit the relative rotation between the first rod and the housing.

8. In an animal grapple device comprising, an elongated housing member;

a first rod member rotatably positioned in said housing member and having its ends extending beyond the adjacent ends of said housing member;

a second rod member affixed in parallel relationship to the side of one end of said housing member, said second rod extending along said first rod member and terminating in a first jaw portion;

a third rod member affixed in parallel relationship to said grapple device adjacent said connection between said housing and said second rod member, said third rod member being spaced rearwardly of said first jaw portion and terminating in a second jaw portion;

said first rod member terminating at one end in a third jaw portion adjacent said first jaw portion;

a fourth rod member affixed to said first rod member adjacent said one end of said housing and terminating at one end in a fourth jaw portion adjacent said second jaw portion;

stop means for limiting relative longitudinal movement between said housing and said first rod member;

handle means on the other end of said first rod member to impart rotational movement thereto relative to said housing; and said first and third jaw portions respectively and said second and fourth jaw portions respectively adapted to move in registering relationship to and from an open and closed position.

9. The structure of claim 8 wherein said third rod is secured to the bottom side of said second rod member and said fourth rod is secured to the bottom side of said first rod, the secured portions of said third and fourth rods are adapted to engage each other when said jaws are moved to their closed position to limit the relative rotation between the first rod and the housing.

10. In an animal grapple device comprising, an elongated housing member;

a first rod member rotatably positioned in said housing member and having its ends extending beyond the adjacent ends of said housing member;

a second rod member affixed in parallel relationship to the side of one end of said housing member, said second rod extending along said first rod member and terminating in a first jaw portion, said first jaw portion extending downwardly, outwardly and forwardly of said second rod, and thence downwardly, inwardly and rearwardly of said second rod and terminating therebelow;

a third rod member affixed in parallel relationship to said grapple device adjacent said connection between said housing and said second rod member, said third rod member being spaced rearwardly of said first jaw portion and terminating in a second jaw portion, said second jaw portion extending outwardly and downwardly of said second rod member, and thence inwardly, and downwardly of said second rod member and terminating therebelow;

said first rod member terminating at one end in a third jaw portion adjacent said first jaw portion, said third jaw portion extending downwardly, outwardly and forwardly of said first rod, and thence downwardly, inwardly and rearwardly of said first rod member;

a fourth rod member affixed to said first rod member adjacent said one end of said housing and terminating at one end in a fourth jaw portion adjacent said second jaw portion, said fourth jaw portion extending outwardly and downwardly of said fourth rod member, and thence inwardly and downwardly of said second rod member and terminating therebelow;

said second and fourth jaw portions having end portions which extend forwardly towards said first and third jaw portions;

stop means for limiting relative longitudinal movement between said housing and said first rod member;

handle means on the other end of said first rod member to impart rotational movement thereto relative to said housing; and said first and third jaw portions respectively and said second and fourth jaw portions respectively adapted to move in registering relationship to and from an open and closed position.

References Cited by the Examiner

UNITED STATES PATENTS

| | | | |
|---|---|---|---|
| 1,882,934 | 10/32 | Rogaczewicz | 294—11 |
| 2,135,232 | 11/38 | Dawn | 294—11 |
| 2,503,430 | 4/50 | Baribault | 294—104 |
| 2,587,383 | 2/52 | Reents | 119—154 |

SAMUEL KOREN, *Primary Examiner.*

CARL W. ROBINSON, HUGH R. CHAMBLEE,
*Examiners.*